United States Patent
Kons et al.

(10) Patent No.: US 10,855,425 B2
(45) Date of Patent: Dec. 1, 2020

(54) PILOT SCRAMBLING FOR CHANNEL ESTIMATION

(71) Applicant: Cohere Technologies, Inc., Santa Clara, CA (US)

(72) Inventors: Shachar Kons, Santa Clara, CA (US); Michail Tsatsanis, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/460,851

(22) Filed: Jul. 2, 2019

(65) Prior Publication Data

US 2019/0327054 A1 Oct. 24, 2019

Related U.S. Application Data

(63) Continuation of application No. PCT/US2018/013022, filed on Jan. 9, 2018.
(Continued)

(51) Int. Cl.
 *H04L 5/00* (2006.01)
 *H04L 5/02* (2006.01)
 *H04L 25/02* (2006.01)

(52) U.S. Cl.
 CPC .......... *H04L 5/0048* (2013.01); *H04L 5/0026* (2013.01); *H04L 5/026* (2013.01); *H04L 25/0226* (2013.01); *H04L 25/0232* (2013.01); *H04L 25/0242* (2013.01); *H04L 25/0256* (2013.01)

(58) Field of Classification Search
 None
 See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.

(Continued)

*Primary Examiner* — Diane L Lo
(74) *Attorney, Agent, or Firm* — Perkins Coie

(57) ABSTRACT

A wireless communication technique to improve channel estimation using pilot signals includes receiving data symbols for transmission over a wireless communication channel using multiple antenna ports, generating a plurality of scrambling sequences, each corresponding to one of the multiple antenna ports, mapping, for each antenna port, a corresponding pilot signal to time and frequency transmission resources using a corresponding scrambling sequence, multiplexing a first input from the data symbols and a second input from the mapping of the corresponding pilot signal to generate an output signal, and transmitting the output signal over a wireless communication channel.

19 Claims, 14 Drawing Sheets

Related U.S. Application Data

(60) Provisional application No. 62/444,216, filed on Jan. 9, 2017.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combos et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Marione et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0205552 A1 | 8/2008 | Sartori et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0268910 A1 | 10/2009 | Liu et al. |
| 2009/0296563 A1* | 12/2009 | Kishiyama ............ H04L 5/0051 370/210 |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0044728 A1 | 2/2013 | Guo et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0114534 A1 | 5/2013 | Ji et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |

(56) References Cited

U.S. PATENT DOCUMENTS

| | | | |
|---|---|---|---|
| 2014/0364128 A1 | 12/2014 | Lee et al. | |
| 2015/0117395 A1 | 4/2015 | Hadani et al. | |
| 2015/0326273 A1 | 11/2015 | Rakib et al. | |
| 2015/0327085 A1 | 11/2015 | Hadani et al. | |
| 2015/0382231 A1 | 12/2015 | Jabbar et al. | |
| 2016/0043835 A1 | 2/2016 | Hadani et al. | |
| 2016/0135132 A1 | 5/2016 | Donepudi et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1 | 10/2016 | Tehrani et al. | |
| 2016/0366717 A1* | 12/2016 | Yang | H04W 72/0406 |
| 2016/0380743 A1 | 12/2016 | Rakib | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib et al. | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |
| 2018/0091277 A1* | 3/2018 | Davydov | H04L 27/2613 |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016182591 A1 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, mailed Oct. 29, 2013, 17 pp.

International Preliminary Report on Patentability for International Application No. PCT/US2013/047723, dated Dec. 31, 2014, 15 pages.

Notice of Allowance for U.S. Appl. No. 13/927,088, dated Feb. 18, 2015, 7 pages.

Office Action for U.S. Appl. No. 13/927,088, dated Nov. 28, 2014, 13 pages.

Notice of Allowance for U.S. Appl. No. 13/927,086, dated Dec. 26, 2014, 8 pages.

Supplemental Notice of Allowability for U.S. Appl. No. 13/927,086, dated Mar. 19, 2015, 4 pages.

Office Action for U.S. Appl. No. 13/927,086, dated Oct. 14, 2014, 10 pages.

Office Action for U.S. Appl. No. 13/927,089, dated Dec. 24, 2014, 13 pages.

Office Action for U.S. Appl. No. 13/927,089, dated Aug. 14, 2015, 7 pages.

Supplemental Notice of Allowability for U.S. Appl. No. 13/927,091, dated Jun. 11, 2015, 4 pages.

Notice of Allowance for U.S. Appl. No. 13/927,091, dated Apr. 24, 2015, 8 pages.

Office Action for U.S. Appl. No. 13/927,091, dated Jan. 27, 2015, 15 pages.

Office Action for U.S. Appl. No. 13/927,092, dated Oct. 8, 2014, 5 pages.

Notice of Allowance for U.S. Appl. No. 13/927,092, dated Oct. 24, 2014, 7 pages.

Office Action for U.S. Appl. No. 13/927,095, dated Apr. 30, 2015, 11 pages.

Office Action for U.S. Appl. No. 13/927,095, dated Nov. 4, 2015, 9 pages.

Office Action for U.S. Appl. No. 13/927,095, dated Jun. 1, 2016, 10 pages.

Office Action for U.S. Appl. No. 14/717,886, dated Apr. 19, 2016, 10 pages.

Office Action for U.S. Appl. No. 14/709,377, dated Dec. 11, 2015, 12 pages.

Office Action for U.S. Appl. No. 14/709,377, dated Jul. 13, 2016, 17 pages.

Examination Report No. 1 for Australian Application No. 2013239970, dated Dec. 8, 2015, 3 pages.

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

Catt, "UL ACK/NACK transmission methods for LTE-A," 3GPP TSG RAN WG1 Meeting #60bis, R1-102453, Beijing, China, Apr. 12-16, 2010, 8 pages.

(56) References Cited

OTHER PUBLICATIONS

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Supplementary European Search Report for European Application No. 18736505.1, dated Aug. 10, 2020, 17 pages.

* cited by examiner

| Antenna port $p$ | $[\bar{w}_p(0) \ \bar{w}_p(1) \ \bar{w}_p(2) \ \bar{w}_p(3)]$ |
|---|---|
| 7 | $[+1 \ +1 \ +1 \ +1]$ |
| 8 | $[+1 \ -1 \ +1 \ -1]$ |
| 9 | $[+1 \ +1 \ +1 \ +1]$ |
| 10 | $[+1 \ -1 \ +1 \ -1]$ |
| 11 | $[+1 \ +1 \ -1 \ -1]$ |
| 12 | $[+1 \ -1 \ -1 \ +1]$ |
| 13 | $[-1 \ -1 \ +1 \ +1]$ |
| 14 | $[-1 \ +1 \ +1 \ -1]$ |

FIG. 4

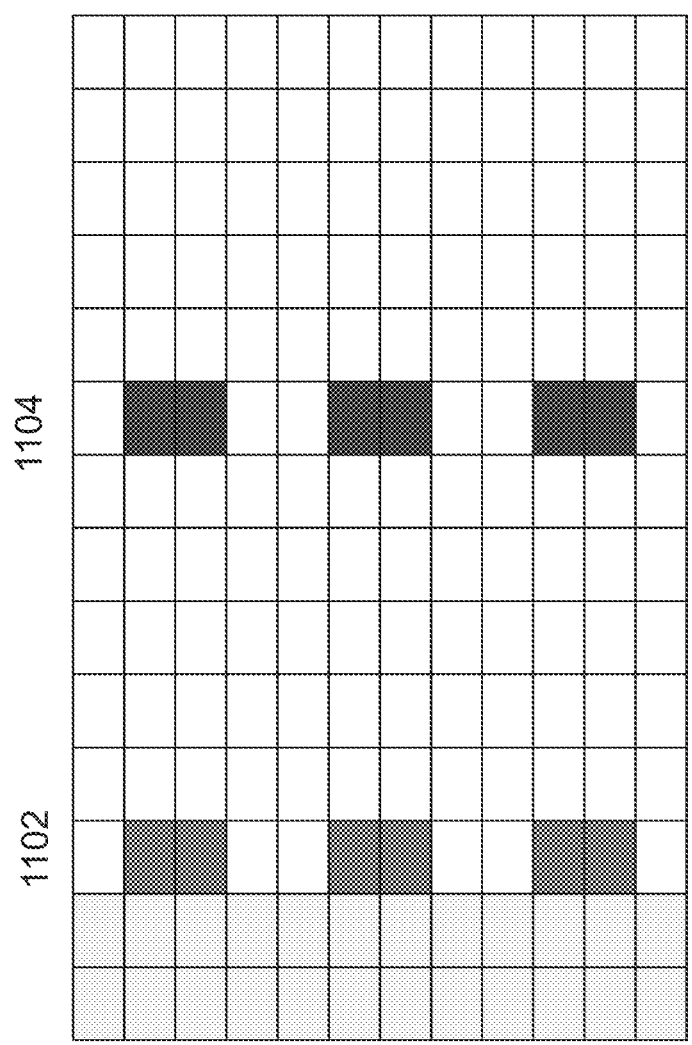

PILOT SCRAMBLING FOR CHANNEL ESTIMATION

CROSS REFERENCE TO RELATED APPLICATIONS

This patent document is a continuation of PCT Application No. PCT/US2018/013022 entitled "PILOT SCRAMBLING FOR CHANNEL ESTIMATION", filed on Jan. 9, 2018 which claims the benefit of U.S. Provisional Patent Application No. 62/444,216 entitled "PILOT SCRAMBLING FOR IMPROVED CHANNEL ESTIMATION", filed on Jan. 9, 2017. The entire contents of the before-mentioned patent applications are incorporated by reference as part of the disclosure of this document.

TECHNICAL FIELD

The present document relates to wireless communication, and more particularly, transmission of pilot signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for transmission of pilot signals from a transmitter having multiple antenna ports.

In one example aspect, a method of wireless communication includes receiving data symbols for transmission over a wireless communication channel using multiple antenna ports, generating a plurality of scrambling sequences, each corresponding to one of the multiple antenna ports, mapping, for each antenna port, a corresponding pilot signal to time and frequency transmission resources using a corresponding scrambling sequence, multiplexing a first input from the data symbols and a second input from the mapping of the corresponding pilot signal to generate an output signal, and transmitting the output signal over a wireless communication channel.

In another example aspect, a wireless communication apparatus that implements the above-described method is disclosed.

In yet another example aspect, the method may be embodied as processor-executable code and may be stored on a computer-readable program medium.

These, and other, features are described in the present document.

DESCRIPTION OF THE DRAWINGS

Drawings described herein are used to provide a further understanding and constitute a part of this application. Example embodiments and illustrations thereof are used to explain the technology rather than limiting its scope.

FIG. 4 shows an example of pilot multiplexing codes.

FIG. 11 shows an example of Time-frequency reference signal grid example.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only.

In present day orthogonal frequency division multiplexing (OFDM) systems such as the Long Term Evolution (LTE) system, multiple antenna ports may be used for transmission of signals, including data and pilot signals. Signals from the multiple antenna ports may be multiplexed together across the time domain. One limitation of prior art is that the performance of such a system degrades rapidly with high mobility user equipment (UE). The techniques disclosed in the present document overcome this limitation, among other advantageous aspects, by providing a different scrambling sequence for each antenna port for transmission of pilot signals. As demonstrated by simulation results discussed elsewhere in the present document, this technique provides superior performance.

Figure 1:
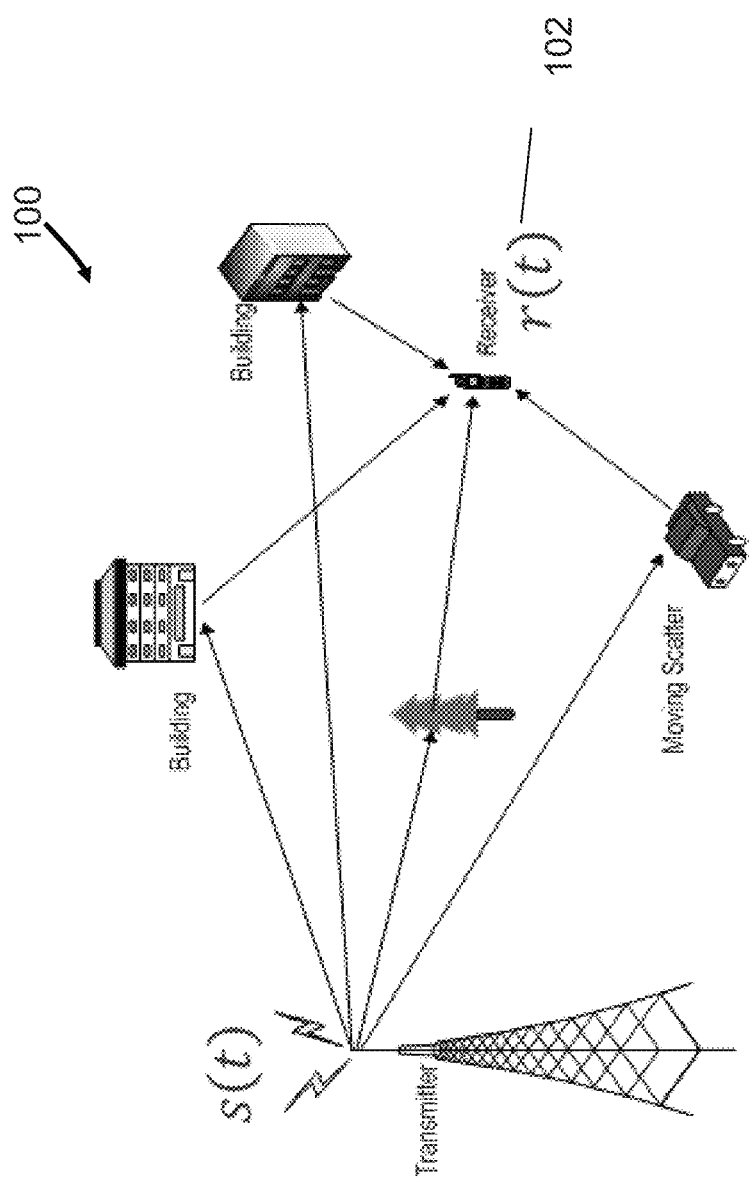
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station).

The LTE system transmits data to each specific UE in the downstream in bursts of 1 msec length comprising of 14

OFDM symbols (for normal cyclic prefix length operation). The subcarrier allocation for that UE can be in blocks of 12 subcarriers.

Figure 2:
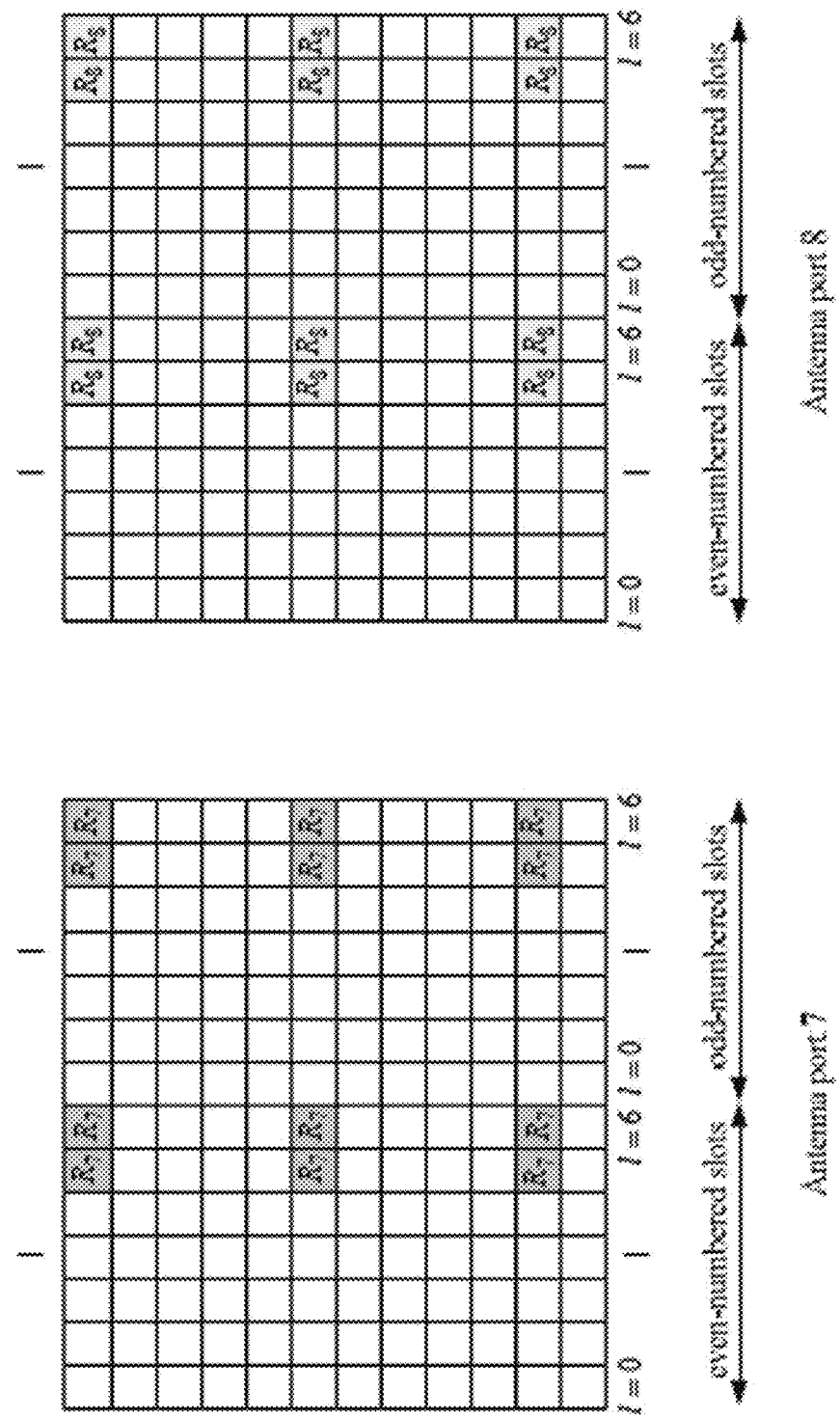
FIG. 2 shows an example of pilot locations where two antenna ports can be multiplexed.

FIG. 2 shows an example of pilot locations where two antenna ports can be multiplexed. FIG. 2 shows the allocation of pilot subcarriers for the first and second antenna ports. An antenna port can be a single antenna or some unique linear combination of multiple antennas. These particular ports have the names Port 7 and Port 8 in 3GPP-30.211 release 12 (respectively represented by shaded squares labeled $R_7$ and $R_8$). Notice that the two ports occupy the same Resource Elements (or subcarriers). An orthogonal Hadamard code of length two is used to separate the two ports. The code is applied to neighboring resource elements.

Figure 3:
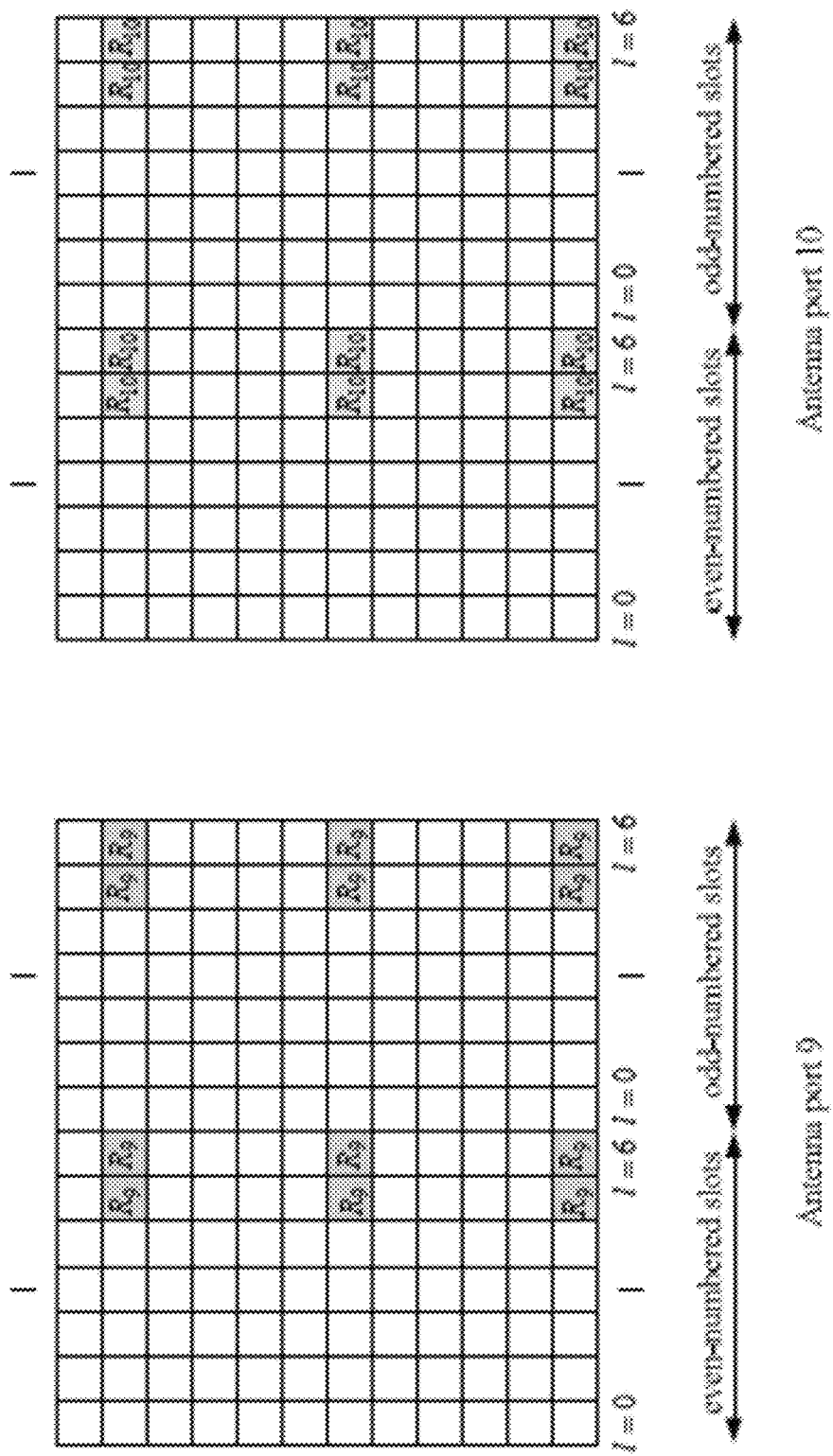
FIG. 3 shows an example of additional pilot locations where two additional Antenna ports can be multiplexed.

FIG. 3 shows an example of additional pilot locations where two additional Antenna ports can be multiplexed. FIG. 3 illustrates the pilot locations for an additional two antenna ports (R9 and R10). Notice that the locations of FIG. 3 are shifted by one position with respect to the locations of FIG. 2 and thus avoid interference.

When more antenna ports are required, a code of length four is used in FIG. 2 across the time dimension (time and frequency), this way allowing the packing of pilots for four antenna ports. In the same manner four additional antenna ports can be accommodated in the pilot positions of FIG. 3, allowing for a maximum of eight antenna ports. In the LTE specification they are enumerated as Antenna Port 7-Antenna Port 14 and use the codes shown in FIG. 4.

FIG. 4 shows an example of pilot multiplexing codes used for multiplexing pilot signals in a manner resulting in orthogonal pilot signals.

Figure 5:
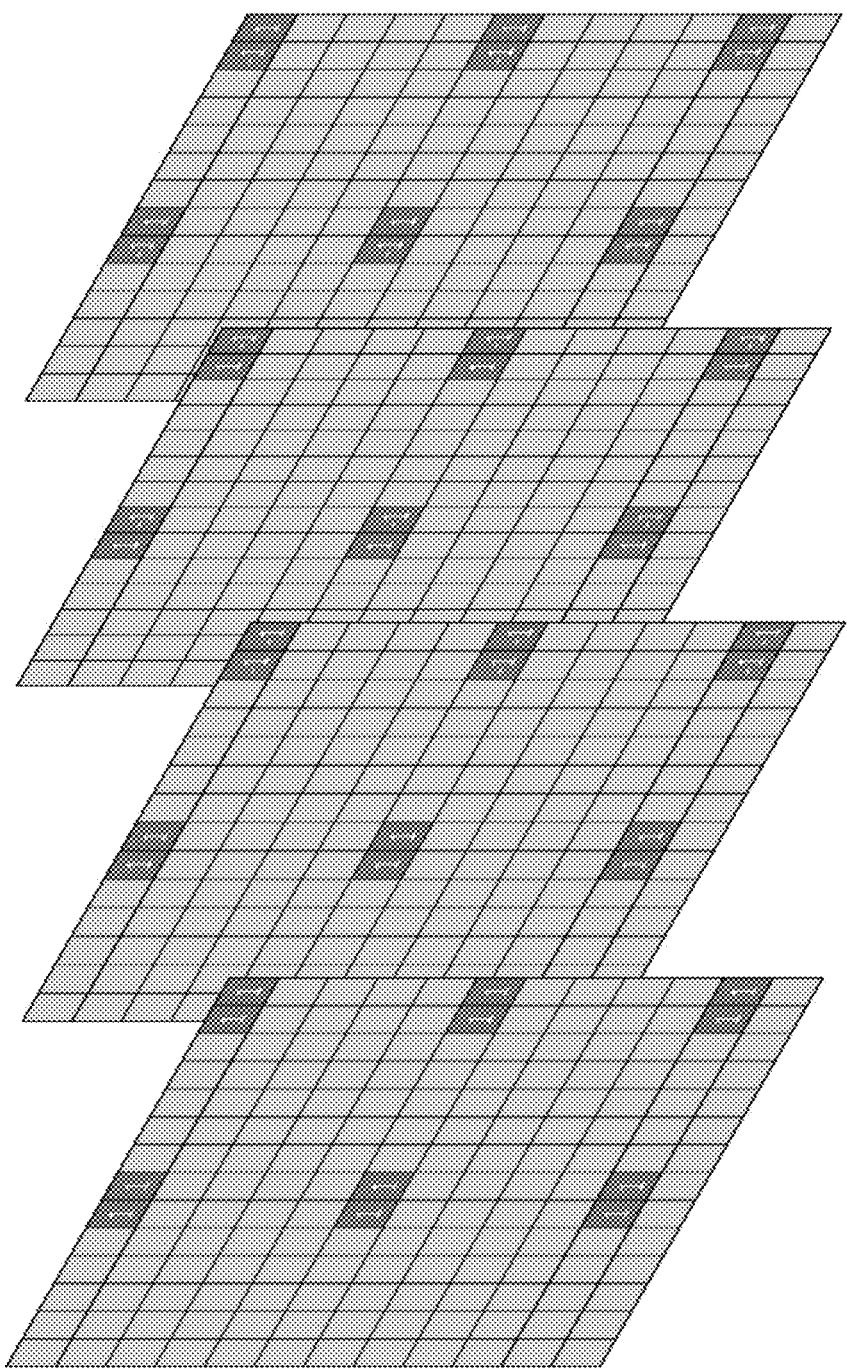
FIG. 5 shows an example of four pilot ports multiplexed with an orthogonal cover code of length 4.

FIG. 5 shows an example of four pilot ports multiplexed with an Orthogonal Cover Code of Length 4. FIG. 5 shows pictorially the way four pilot ports would be superimposed on the same resource elements by the use of an orthogonal code of length four. In this figure the vertical dimension denotes frequency and the horizontal dimension denotes time. As can be seen the orthogonal code is applied across time. In this figure, the same value appears to be transmitted across frequency for each of the pilot ports. In reality, each pilot port is scrambled across frequency by a pilot sequence.

Figure 6:
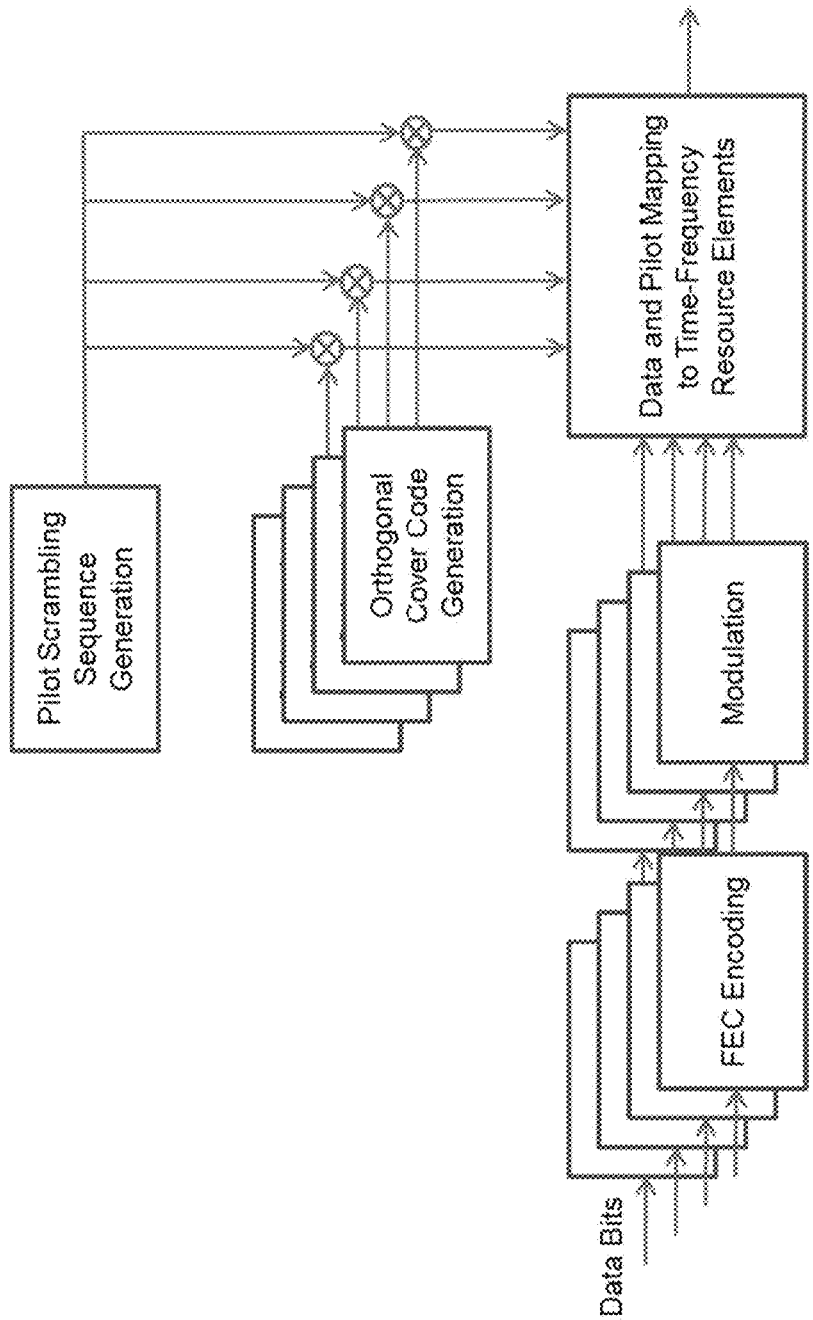
FIG. 6 is an example of a pilot and data mapping on the LTE resource grid.
Figure 7:
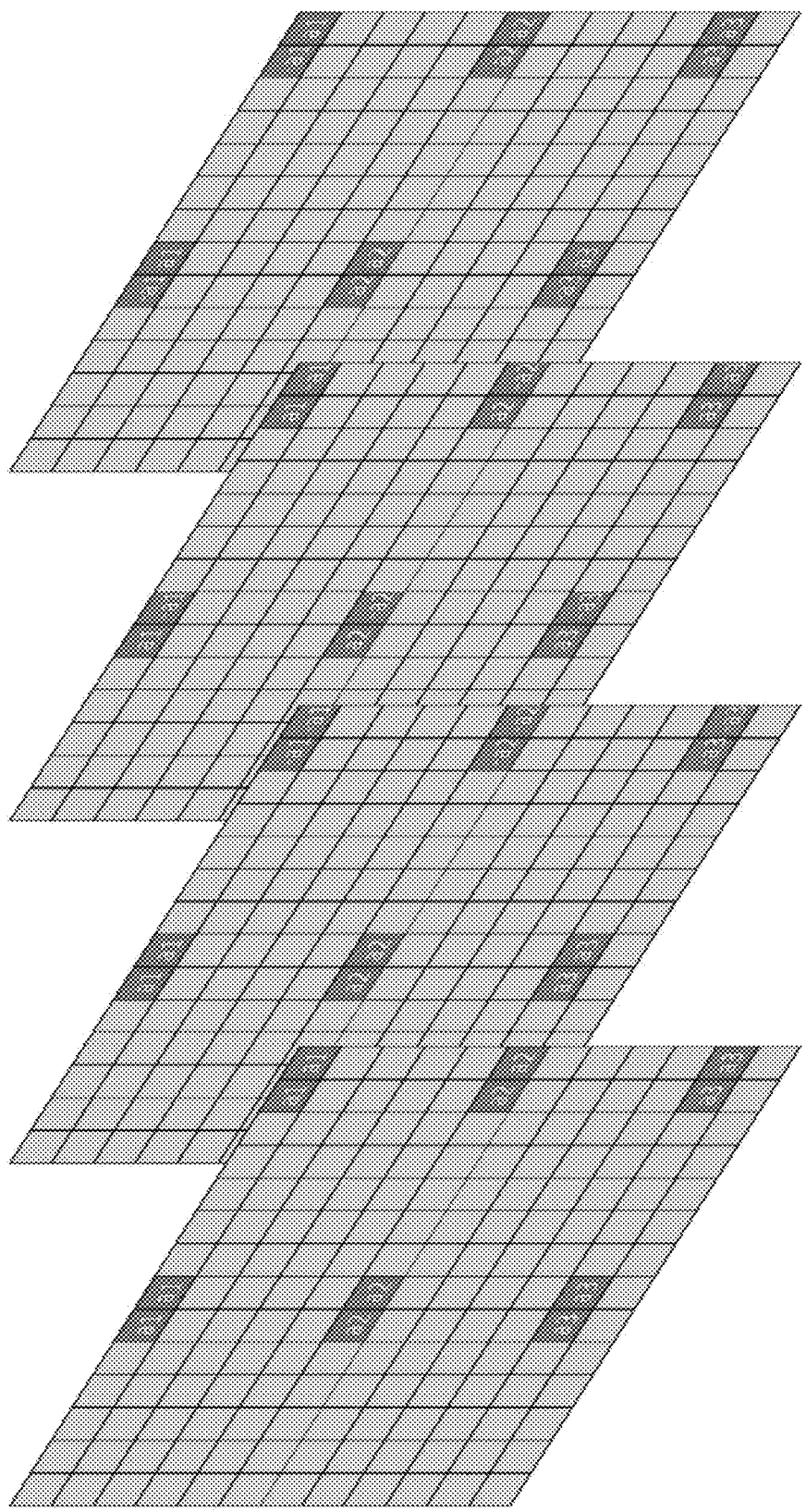
FIG. 7 shows an example of four pilot ports multiplexed and scrambled with the same scrambling sequence.

FIG. 6 shows the block diagram of the pilot values generated by the modulation of the orthogonal codes by a scrambling sequence. As depicted in FIG. 6, from left to right, data bits are first encoded using forward error correction coding (FEC encoding). The resulting encoded bits are modulated using a modulation scheme such as QAM. The modulated symbols are mapped to time-frequency resource elements along with pilot signals that are received from a pilot scrambling sequence generation module whose output is multiplied by orthogonal cover codes generated by an orthogonal cover code generation module. By applying the pilot scrambling sequence {a1, a2, a3, . . . } across frequency, the pilot values shown in FIG. 5 are changed to the pilot values of FIG. 7.

Limitations of Prior Art

The LTE specification uses orthogonal Hadamard codes to multiplex up to eight antenna ports in two groups of four ports each. However, the Hadamard code orthogonality is generally lost after the pilots have propagated through the wireless channel. This is addressed in prior art in two ways.

No code multiplexing is used across the frequency dimension where the channel frequency response can significantly impair orthogonality.

Code multiplexing is used across the time dimension, but is only used in situations where the channel is approximately time invariant within the 1 msec transmission time interval (low Doppler case). Then code orthogonality is preserved.

The limitation of prior art is that antenna port multiplexing across the time domain does not provide good performance for high mobility user equipment (UEs), especially when four pilot ports are multiplexed using an orthogonal cover code (Hadamard code) of length four.

The LTE design was inspired by a low Doppler use case (closed loop MIMO) and low complexity implementation. Indeed, in the low Doppler case, the cover codes across time are received perfectly orthogonal, and simple projection to each cover code perfectly separates each pilot port, even in the extreme case of four pilot ports for a four point cover code. Subsequently, channel interpolation via MMSE or other techniques can be performed on each pilot port separately.

However, under moderate Doppler effects, the orthogonality of the cover codes is compromised and the performance deteriorates.

In one advantageous aspect, the disclosed techniques can be used to improve the separability of the pilot waveforms for the different pilot ports by replacing the single pilot scrambling sequence present in the prior art with a scrambling sequence that is different for each pilot port. Two different ways are disclosed for designing the pilot sequences. This modification combined with joint MMSE pilot interpolation techniques results in significantly improved performance, as is discussed herein.

Figure 8:
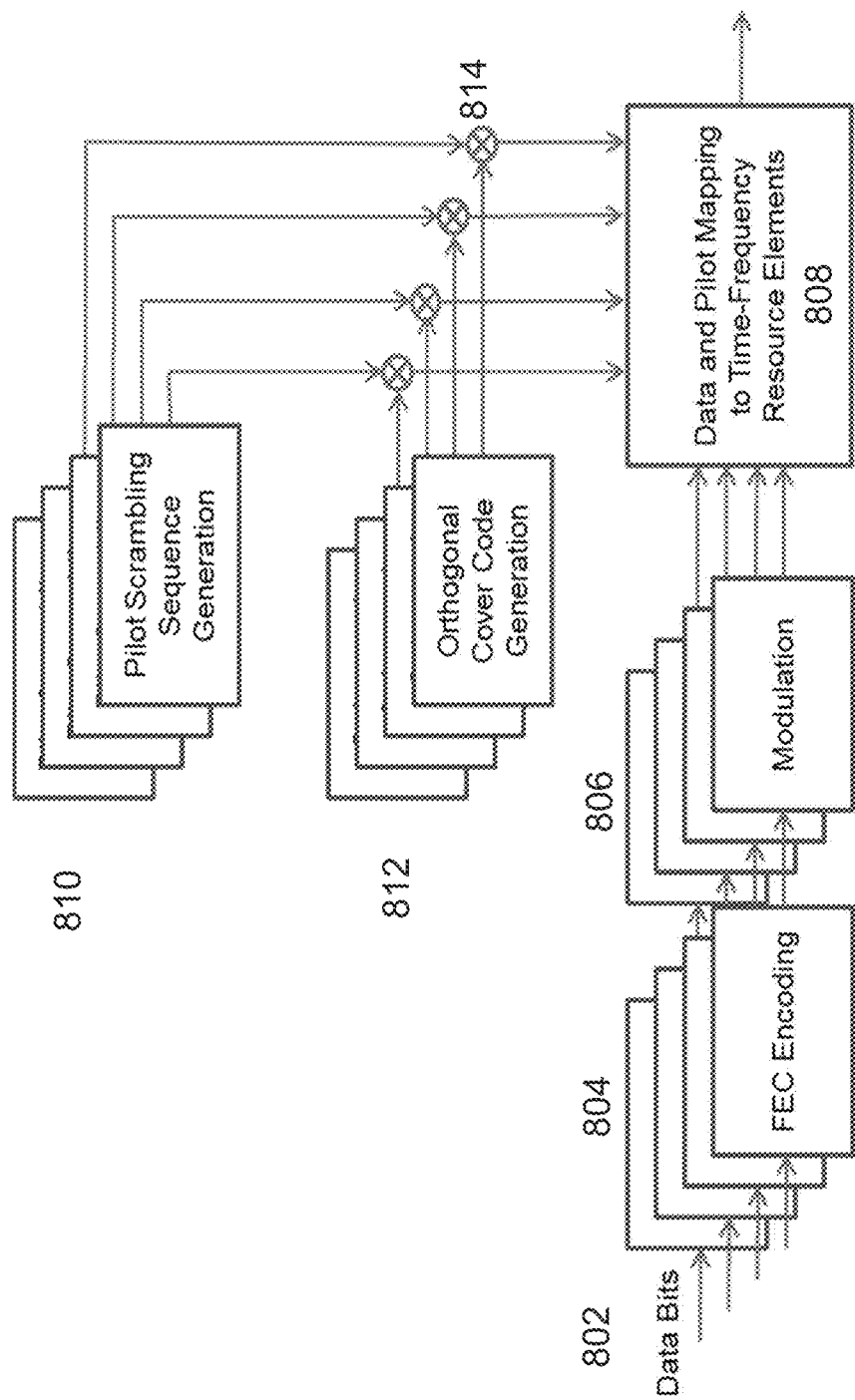
FIG. 8 shows an example of pilot and data mapping using pilot port dependent scrambling sequences.

FIG. 8 shows the block diagram of a pilot and data multiplexing system similar to the one in FIG. 6, with the modification that a different pilot scrambling sequence is generated for each antenna port. In this system, data bits 802 are error correction coded using an FEC encoding module 804. The error correction coded data bits are modulated to symbols (e.g., QAM) using a modulation module 806. A pilot scrambling sequence generation module 810 generates pilot signals that are multiplexed (814) using orthogonal cover codes generated by a orthogonal cover code generation module 812. The orthogonalized pilot signals are mapped, along with the output of the modulation module 806, are mapped to time and frequency elements by a module 808. For example, denoting the different pilot scrambling sequences by {a1, a2, a3, . . . }, {b1, b2, b3, . . . }, {c1, c2, c3, . . . }, {d1, d2, d3, . . . }, then the pilot values for each antenna port are shown in FIG. 9.

Figure 9:
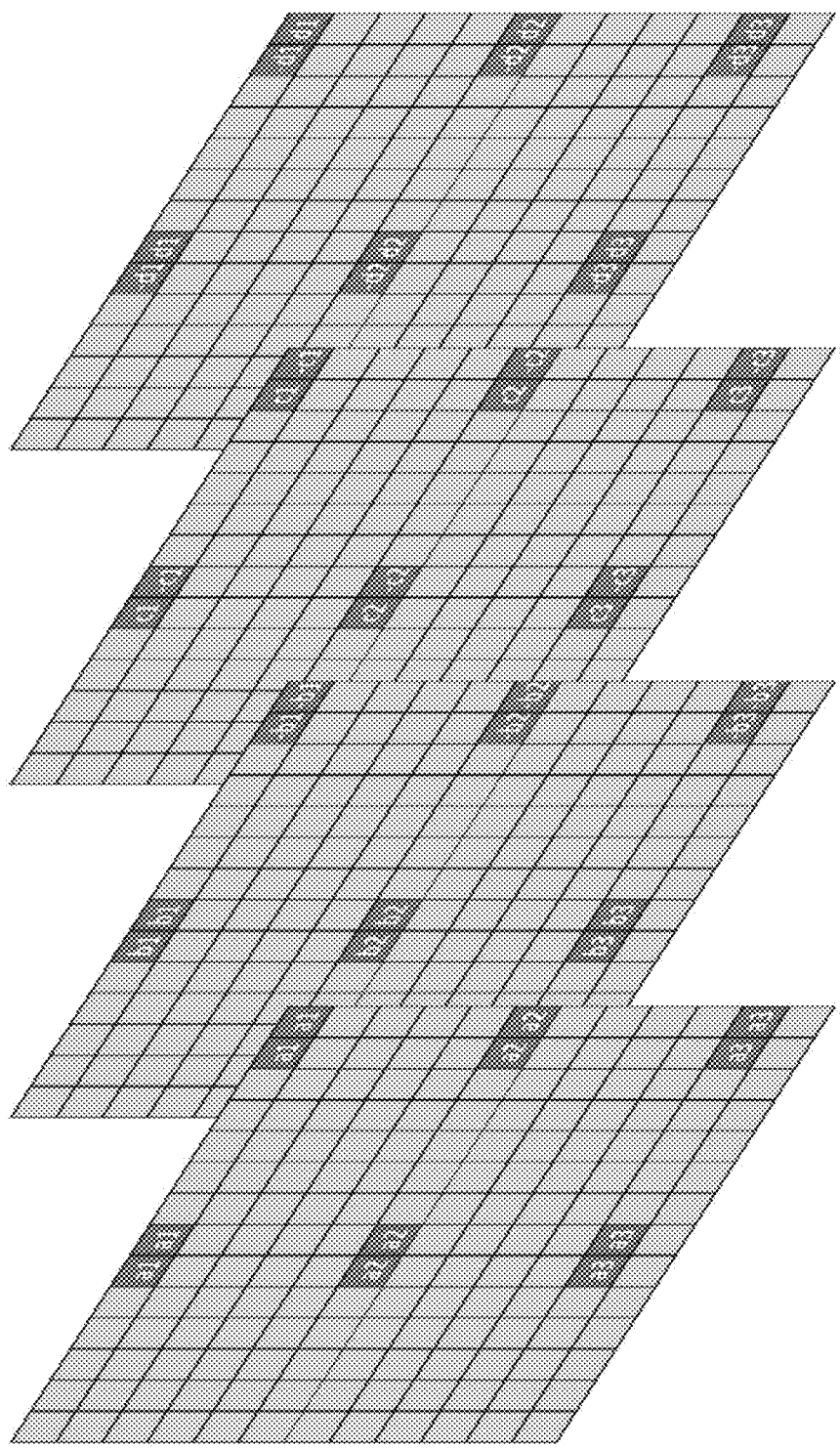
FIG. 9 is an example of four pilot ports multiplexed and scrambled with different scrambling sequences.

In FIG. 9, each resource element is shown with a corresponding scrambling sequence code, as above.

A computationally efficient way to generate those different scrambling sequences is to utilize the same PN sequence generator hardware, but initialize the feedback shift register with a different value for each antenna port. In this way, the sequences used for each antenna port are randomized with respect to each other.

A variation to this pilot sequence design is to use the same basic scrambling sequence for all ports but use a different circular shift of the pilot waveform (in the time domain) or linear phase modulation (in the frequency domain) for each pilot port. For four ports we use a circular shift of 0, N/4, N/2 and 3N/4 samples respectively for each port where N is the OFDM symbol length. This is actually implemented by modulating the PN sequence in the frequency domain by complex exponentials of frequency 0, $\pi/2$, $\pi$, and $3\pi/4$ respectively.

Given the pilot placement and pilot values above, the task of channel estimation is to separate the antenna ports and interpolate the channel response for each antenna port to the time-frequency grid points where no pilot signal is received.

If a receiver collects all received values for the time-frequency points where pilots are transmitted in a vector $h_p$, and all values for the time-frequency point we wish to interpolate each antenna port by $h^{(i)}$, i=1, . . . , 4 then the interpolation is achieved by an interpolation matrix, represented as follows:

$$h^{(i)} = C^{(i)} h_p \qquad (1)$$

The interpolation matrix $C^{(i)}$ is designed by minimizing the MSE criterion as is well understood to people versed in the art. In the case of antenna port dependent scrambling sequences, as disclosed here, a joint MMSE channel interpolation can be used. In this case, the above equation becomes:

$$\begin{bmatrix} h^{(1)} \\ \vdots \\ h^{(4)} \end{bmatrix} = C h_p \qquad (2)$$

In the above equation, the joint MMSE interpolation matrix is C and is designed according to the MMSE criterion as well.

Example Benefits

Figure 10A:
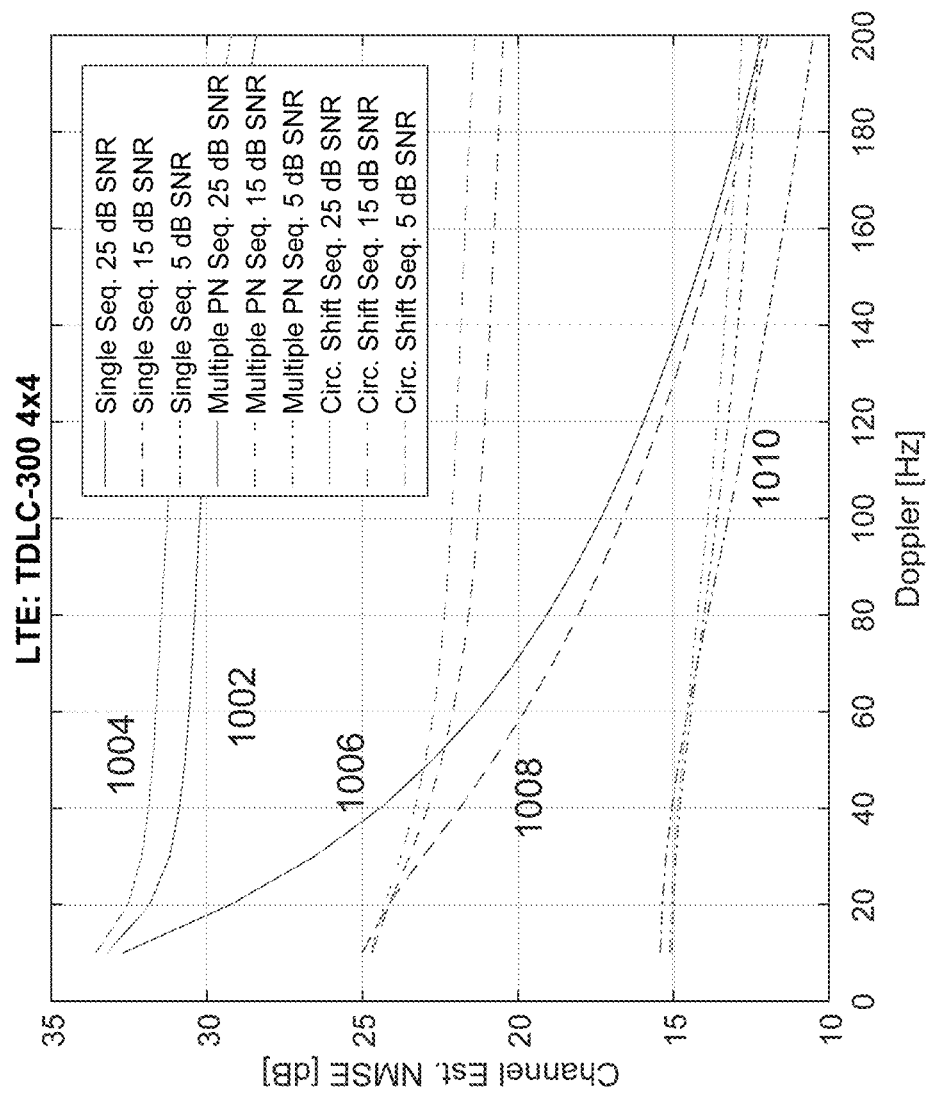
FIG. 10A shows an example channel estimation NMSE vs Doppler for TDLC-300.

FIG. 10A shows the channel estimation performance as a function of Doppler spread for the extreme case of multiplexing four pilot ports (namely ports 7, 8, 11, 12) on the four point cover code. The normalized channel estimation MS error is shown, averaged over the whole subframe, versus max Doppler spread. The curve 1006 indicates the performance using the LTE pilot sequence, which is identical for all pilot ports. Three SNR points are depicted, 25, 15 and 5 dB with curves 1006, 1008 and 1010 respectively. Notice that the performance deteriorates even for moderate Doppler, especially for the high SNR case; for example, for 100 Hz Doppler a loss of more than 15 dB is observed compared to 10 Hz Doppler.

The Doppler performance can be improved with a better design of the pilot sequences which exploits the potential of more advanced signal processing, i.e. joint pilot port MMSE interpolation. In that case the system benefits from pilot sequences that are not identical across pilot ports but afford some separability.

The curve 1002 in FIG. 10A shows the performance when different pilot sequences are used for different antenna ports. The different sequences are generated by utilizing different initial conditions for the feedback shift register of the PN generator. Notice a remarkable improvement even for moderate mobility. For example, for 100 Hz Doppler, the performance improvement is more than 13 dB.

When the second method of generating different sequences by modulating a base sequence is used, the performance obtained is shown in FIG. 10A in curve 1004. The performance is similar and slightly better than the PN sequence randomization approach depicted in curve 1002.

In the next example, we multiplex four ports on an OCC-4 orthogonal code spanning four time and frequency points of the pilot grid of FIG. 11. In this example the 4-point orthogonal code spans both time (2 points) and frequency (2 points). Similar to the previous case, one value of the pilot scrambling sequence is applied to (multiplies) each 4-point OCC code for each pilot port.

Figure 10B:
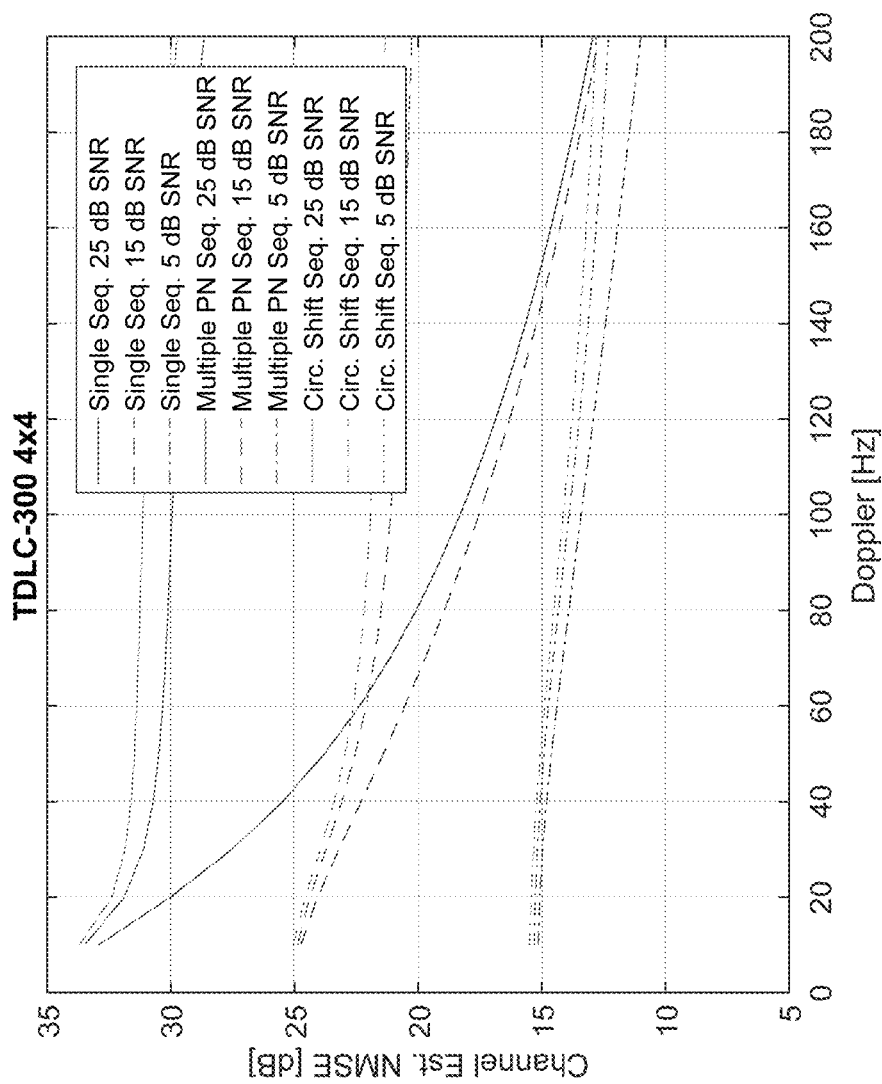
FIG. 10B shows an example channel estimation NMSE vs Doppler for TDLC-300, NR Pilot Grid.

FIG. 10B shows the results for the TDLC-300 channel with a 4 input 4 output configuration, which appear similar to those for the LTE pilots of FIG. 10A. A similar significant gain for both the random initialization pilot sequence case and the circularly shifted pilot sequence case.

FIG. 11 is an example of a Pilot and Data Mapping on the LTE Resource Grid. The time slots 1102 and 1104 shows time slots on in which the pilot signals (dark shaded REs) are transmitted.

Figure 12:
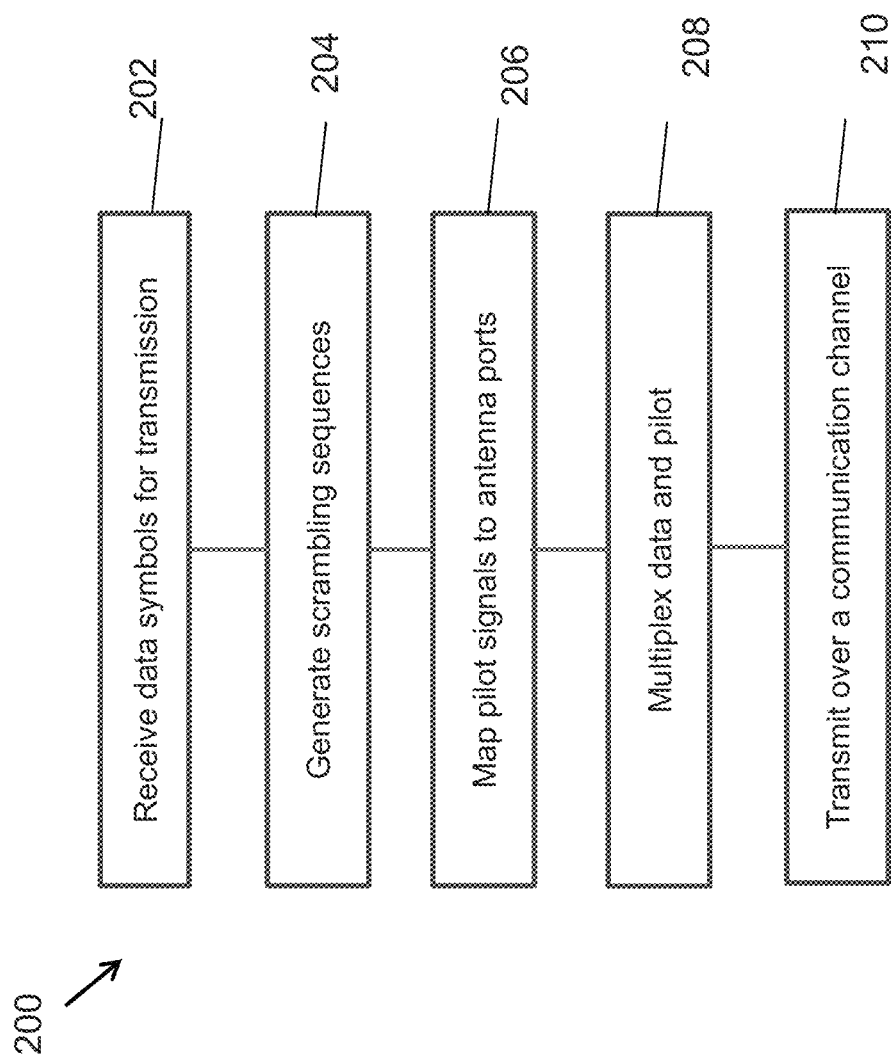
FIG. 12 shows a flowchart of an example wireless communication transmission method.

FIG. 12 shows a flowchart representation of an example method 200 of wireless communication. The method 200 may be implemented by the receiver 102 (on transmit side) or by the base station (on its transmit side).

The method 200 includes, at 202, receiving data symbols for transmission over a wireless communication channel using multiple antenna ports. The data symbols may be locally generated by the transmitting device or may be received from a user interface or a network interface of the device (not shown in the drawings). The receiving operation may include, for example, receiving the data from user applications running on the transmitting device. In some cases, the data may be received at a peripheral or second network interface from other users for transmission over the wireless channel.

The method 200 includes, at 204, generating a plurality of scrambling sequences, each corresponding to one of the multiple antenna ports. Alternatively, the plurality of scrambling sequences may be pre-generated and stored in a memory such as a look-up table, and may be read in some pre-determined manner for use. The scrambling sequences may be generated to follow a certain mathematical property such as spreading the spectral use uniformly, and so on. For example, in some cases, the scrambling sequences may be circularly shifted versions of each other. The scrambling sequence generation may be performed by the module 810 described herein.

The method 200 includes, at 206, mapping, for each antenna port, a corresponding pilot signal to time and frequency transmission resources using a corresponding scrambling sequence. The mapping may be performed by the module 808.

The method 200 includes, at 208, multiplexing a first input from the data symbols (e.g., output of module 806) and a second input from the mapping of the corresponding pilot signal (e.g., output of the stage 814) to generate an output signal.

The method 200 includes, at 210, transmitting the output signal over a wireless communication channel. When the method 200 is implemented by a user device (e.g., receiver 102), each user device may generate its own pilot signals using a scrambling sequence that is generated by the user device. Each user device may thus apply a different scrambling sequence to pilot signals corresponding to different antenna ports of the user device. The randomization of the scrambling sequences thus ensures that, at the base station, the pilot signals corresponding to different antenna ports of a same UE and pilot signals from different UEs can all be separated by the base station, even when these pilot signals are assigned to the same resources.

In some embodiments, a wireless communication apparatus includes a memory and a processor. The processor reads instructions stored in the memory and implements the method 200.

Figure 13:
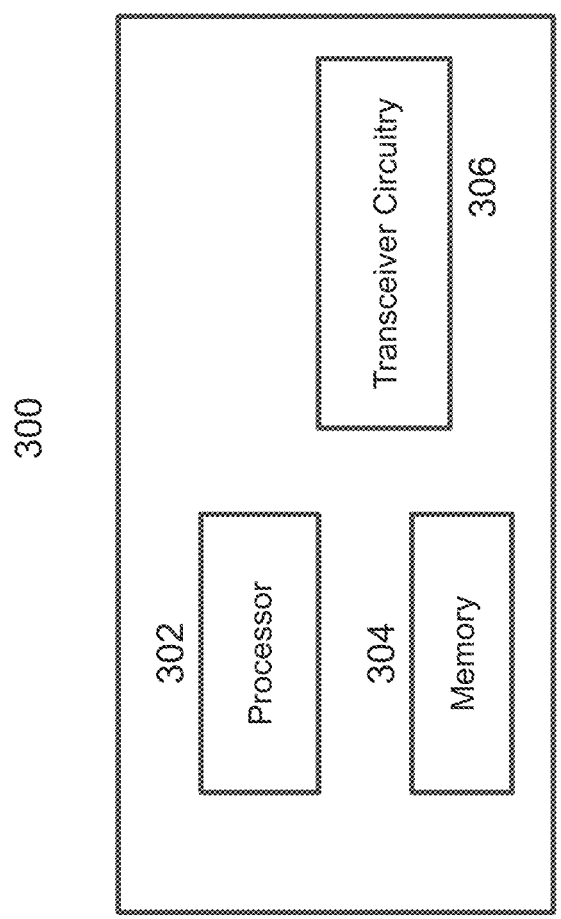
FIG. 13 shows an example of a wireless transceiver apparatus.

FIG. 13 shows an example of a wireless transceiver apparatus 300. The apparatus 300 may be used to implement method 200. The apparatus 300 includes a processor 302, a memory 304 that stores processor-executable instructions and data during computations performed by the processor. The apparatus 300 includes reception and/or transmission circuitry 306, e.g., including radio frequency operations for receiving or transmitting signal and/or receiving data or information bits for transmission over a wireless network.

It will be appreciated that the disclosed techniques are useful in improving channel estimation performance of a wireless communication system by providing more robust channel estimation even under high Doppler conditions.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
    receiving data symbols for transmission over a wireless communication channel using multiple antenna ports;
    generating a plurality of scrambling sequences, each corresponding to one of the multiple antenna ports;
    mapping, for each antenna port, a corresponding pilot signal to time and frequency transmission resources using a corresponding scrambling sequence;
    multiplexing a first input from the data symbols and a second input from the mapping of the corresponding pilot signal to generate an output signal comprising an OFDM symbol; and
    transmitting the output signal over a wireless communication channel,
    wherein the generating the plurality of scrambling sequences comprises:
        using a pseudorandom number generator to generate a pseudorandom sequence,
        generating a plurality of circular shifts based on evenly dividing a length of the OFDM symbol, and
        generating each of the plurality of scrambling sequences by performing a circular shift operation on the pseudorandom sequence using each of the plurality of circular shifts for the each antenna port.

2. The method of claim 1, wherein the circular shift operation is performed in a time domain.

3. The method of claim 1, wherein the circular shift operation is performed by modulating the scrambling sequence by a complex exponential in the frequency domain.

4. The method of claim 1, further including:
generating orthogonal codes,
wherein the mapping includes using the corresponding scrambling sequence and one of the orthogonal codes for mapping pilot signals to time-frequency transmission resources.

5. The method of claim 1, wherein a different modulated version of a same scrambling sequence is used for each antenna port.

6. The method of claim 1, wherein the first input from the data symbols comprises forward error correction coded and modulated data bits.

7. The method of claim 1, further including mapping to shared time-frequency transmission resources being performed by different user equipment.

8. A wireless communication device comprising a memory storing instruction and a processor, wherein the instructions, when executed by the processor, cause the processor to implement a method comprising:
receiving data symbols for transmission over a wireless communication channel using multiple antenna ports;
generating a plurality of scrambling sequences, each corresponding to one of the multiple antenna ports;
mapping, for each antenna port, a corresponding pilot signal to time and frequency transmission resources using a corresponding scrambling sequence;
multiplexing a first input from the data symbols and a second input from the mapping of the corresponding pilot signal to generate an output signal; and
transmitting the output signal over a wireless communication channel,
wherein the generating the plurality of scrambling sequences includes using a different pseudorandom number generator to generate a pseudorandom sequence for each antenna port.

9. The device of claim 8, wherein the method further comprises:
generating orthogonal codes,
wherein the mapping includes using the corresponding scrambling sequence and one of the orthogonal codes for mapping pilot signals to time-frequency transmission resources.

10. The device of claim 8, wherein a different modulated version of a same scrambling sequence is used for each antenna port.

11. The device of claim 8, wherein the first input from the data symbols comprises forward error correction coded and modulated data bits.

12. The device of claim 8, further including mapping to shared time-frequency transmission resources being performed by different user equipment.

13. A wireless signal transmission apparatus comprising a processor, configured to:
receive data symbols for transmission over a wireless communication channel using multiple antenna ports;
generate a plurality of scrambling sequences, each corresponding to one of the multiple antenna ports;
map, for each antenna port, a corresponding pilot signal to time and frequency transmission resources using a corresponding scrambling sequence;
multiplex a first input from the data symbols and a second input from the mapping of the corresponding pilot signal to generate an output signal; and
cause a transmission of the output signal over a wireless communication channel,
wherein generating the plurality of scrambling sequences comprises:
using a pseudorandom number generator to generate a pseudorandom sequence,
generating a plurality of circular shifts based on evenly dividing a length of the OFDM symbol, and
generating each of the plurality of scrambling sequences by performing a circular shift operation on the pseudorandom sequence using each of the plurality of circular shifts for the each antenna port.

14. The apparatus of claim 13, wherein the circular shift operation is performed in a time domain.

15. The apparatus of claim 13, wherein the circular shift operation is performed by modulating the scrambling sequence by a complex exponential in the frequency domain.

16. The apparatus of claim 13, wherein the processor is further configured to:
generate orthogonal codes,
wherein the mapping includes using the corresponding scrambling sequence and one of the orthogonal codes for mapping pilot signals to time-frequency transmission resources.

17. The apparatus of claim 13, wherein a different modulated version of a same scrambling sequence is used for each antenna port.

18. The apparatus of claim 13, wherein the first input from the data symbols comprises forward error correction coded and modulated data bits.

19. The apparatus of claim 13, wherein the processor is further configured to map to shared time-frequency transmission resources being performed by different user equipment.

* * * * *